(12) United States Patent
Niemi

(10) Patent No.: US 11,906,205 B2
(45) Date of Patent: Feb. 20, 2024

(54) GEOTHERMAL HEAT EXCHANGER, GEOTHERMAL HEAT ARRANGEMENT AND METHOD FOR CHARGING THERMAL ENERGY INTO GROUND

(71) Applicant: QUANTITATIVE HEAT OY, Helsinki (FI)

(72) Inventor: Rami Niemi, Helsinki (FI)

(73) Assignee: QUANTITATIVE HEAT OY, Helsinki (FI)

( * ) Notice: Subject to any disclaimer, the term of this patent is extended or adjusted under 35 U.S.C. 154(b) by 481 days.

(21) Appl. No.: 16/963,528

(22) PCT Filed: Feb. 12, 2019

(86) PCT No.: PCT/FI2019/050103
§ 371 (c)(1),
(2) Date: Jul. 21, 2020

(87) PCT Pub. No.: WO2019/155129
PCT Pub. Date: Aug. 15, 2019

(65) Prior Publication Data
US 2021/0048229 A1    Feb. 18, 2021

(30) Foreign Application Priority Data
Feb. 12, 2018    (FI) ................................... 20185124

(51) Int. Cl.
*F24T 10/17*    (2018.01)
*F24T 10/15*    (2018.01)
(Continued)

(52) U.S. Cl.
CPC ............... *F24T 10/17* (2018.05); *F24D 5/12* (2013.01); *F24T 10/10* (2018.05); *F24T 10/15* (2018.05);
(Continued)

(58) Field of Classification Search
CPC . F24T 10/17; F24T 10/10; F24T 10/15; F24T 2010/56; F24D 5/12; F24D 2200/11;
(Continued)

(56) References Cited

U.S. PATENT DOCUMENTS 4,741,388 A     5/1988 Kuroiwa
2005/0061472 A1* 3/2005 Guynn .................... F24T 10/15
                                              165/104.11
(Continued)

FOREIGN PATENT DOCUMENTS

CN    106885386 A    6/2017
DE      3029753 A1   2/1982
(Continued)

OTHER PUBLICATIONS

International Search Report issued by the Finnish Patent and Registration Office acting as the International Searching Authority in relation to International Application No. PCT/FI2019/050103 dated Jun. 12, 2019 (6 pages).
(Continued)

*Primary Examiner* — Mickey H France
(74) *Attorney, Agent, or Firm* — Robert P. Michal, Esq.; Carter, DeLuca & Farrell LLP

(57) ABSTRACT

A geothermal heat exchanger, a geothermal heat arrangement and to a method in connection with a geothermal heat arrangement. The geothermal heat exchanger includes a piping arrangement having a rise pipe and a drain pipe, and a first pump arranged to the piping arrangement. The rise pipe and drain pipe are arranged in fluid communication with each other for circulating the primary working fluid. The rise pipe is provided with a first thermal insulation surrounding the rise pipe along at least part of the length of
(Continued)

the rise pipe and the first pump is arranged to circulate the primary working fluid in a direction towards a lower end of the rise pump.

8 Claims, 9 Drawing Sheets

(51) Int. Cl.
*F24D 5/12* (2006.01)
*F28D 20/00* (2006.01)
*F24T 10/10* (2018.01)
*F24T 10/00* (2018.01)
*F24F 5/00* (2006.01)

(52) U.S. Cl.
CPC ...... *F28D 20/0052* (2013.01); *F24D 2200/11* (2013.01); *F24D 2200/12* (2013.01); *F24F 2005/0057* (2013.01); *F24T 2010/56* (2018.05); *F25B 2313/002* (2013.01); *Y02B 10/40* (2013.01); *Y02B 30/13* (2018.05); *Y02E 10/10* (2013.01)

(58) Field of Classification Search
CPC ............. F24D 2200/12; F28D 20/0052; F24F 2005/0057; F25B 2313/002; Y02B 10/40; Y02B 30/13; Y02E 10/10
See application file for complete search history.

(56) References Cited

U.S. PATENT DOCUMENTS

| 2007/0023163 | A1  | 2/2007  | Kidwell et al. |
| 2008/0169084 | A1* | 7/2008  | Bullivant ................. F24T 10/17 165/142 |
| 2010/0270003 | A1  | 10/2010 | Sarria |
| 2013/0333383 | A1* | 12/2013 | Schwarck ............... F24T 10/10 165/45 |
| 2014/0096860 | A1  | 4/2014  | Yang |
| 2015/0068740 | A1* | 3/2015  | Broder ..................... F24T 10/10 175/57 |
| 2015/0316294 | A1* | 11/2015 | Andersson .......... F28D 20/0052 165/45 |
| 2017/0350629 | A1  | 12/2017 | Edwards |

FOREIGN PATENT DOCUMENTS

| DE | 3813014 A1 | 11/1989 |
| DE | 102008057495 A1 | 5/2010 |
| EP | 2639529 A1 | 9/2013 |
| JP | S59157442 A | 9/1984 |
| KR | 101636741 B1 | 7/2016 |
| WO | 2014070096 A1 | 5/2014 |
| WO | WO-2017003239 A1 * | 1/2017 ............. F16L 15/04 |

OTHER PUBLICATIONS

Written Opinion of the International Searching Authority issued by the Finnish Patent and Registration Office acting as the International Searching Authority in relation to International Application No. PCT/FI2019/050103 dated Jun. 12, 2019 (8 pages).

Finnish Search Report issued by the Finnish Patent and Registration Office in relation to Finnish Application No. 20185124 dated Aug. 31, 2018 (2 pages).

* cited by examiner

ID OF THE INVENTION

The present invention relates to a geothermal heat exchanger and a method for charging thermal energy into ground.

BACKGROUND OF THE INVENTION

Ground sourced or geothermal heat exchangers are commonly known for extracting heat energy from the ground. This is carried out by utilizing the temperature difference in the ground and at a level above the ground. The temperature in the ground usually increases when going deeper into the ground.

The ground sourced heat exchangers comprise a piping arrangement for circulating primary working fluid. The piping arrangement normally comprises a closed loop piping having a drain pipe and a rise pipe arranged in a bore hole or, a ground hole or a cavity in the ground. The piping arrangement is further connected to a heat exchanger on the ground for releasing heat energy from the primary working fluid. When the primary working fluid flows downwards into the bore hole in the drain pipe heat energy is extracted from the ground to the primary working fluid and the temperature of the primary working fluid is increased. The circulation of the primary working fluid brings the extracted heat energy from the bore hole on ground in the rise pipe and then the primary working fluid releases heat energy in the heat exchanger to a secondary working fluid.

One of the disadvantages associated with the prior art is that the temperature of the primary working fluid increases gradually when the primary working fluid flows in the drain pipe towards the bottom of the bore hole and similarly the temperature of the primary working fluid decreases as the primary working fluid flows towards ground surface in the rise pipe. Furthermore, the temperature of the primary working fluid drifts towards an average temperature as there occurs unintentional heat exchange between the heated primary working flowing in the rise pipe and the cooled primary working fluid flowing in the drain pipe. Accordingly, heated primary working fluid releases heat energy to the primary working fluid flowing downwards in the drain tube, and also to the ground surrounding the bore hole, thus the temperature of the heated working fluid decreases towards the heat pump arranged usually above the ground surface. This decreases the efficiency of the ground sourced heat exchanger.

Furthermore, it has been recognized that the temperature of the ground surrounding the ground hole, especially in the vicinity of the lower end of the ground hole, decreases as heat energy is extracted from the ground. The temperature decrease of the ground surrounding the ground hole further decreases the heat extraction rate and the efficiency of the ground sourced heat exchanger during time.

BRIEF DESCRIPTION OF THE INVENTION

An object of the present invention is to provide a geothermal heat exchanger, a geothermal heat arrangement and a method in connection with a geothermal heat arrangement so as to solve or at least alleviate the prior art disadvantages.

The objects of the invention are achieved by a geothermal heat exchanger which is characterized by what is stated in the independent claim 1. The objects of the invention are further achieved by a geothermal heat arrangement which is characterized by what is stated in the independent claim 7. The objects of the invention also achieved by a method in connection with a geothermal heat arrangement which is characterized by what is stated in the independent claim 17.

The preferred embodiments of the invention are disclosed in the dependent claims.

The invention is based on the idea of providing a geothermal heat exchanger comprising a piping arrangement for circulating primary working fluid. The piping arrangement comprises a rise pipe having a lower end and a drain pipe having a lower end. The lower end of the rise pipe and the lower end of the drain pipe may be arranged in fluid communication with each other for circulating the primary working fluid in a ground hole along the rise pipe and the drain pipe. The rise pipe may be arranged inside the drain pipe. The geothermal heat exchanger further comprises and a first pump arranged to the piping arrangement.

According to the present invention the rise pipe may be provided with a first thermal insulation surrounding the rise pipe along at least part of the length of the rise pipe and the first pump is arranged to circulate the primary working fluid in a direction towards the lower end of the rise pipe. This allows the primary working fluid to be circulated to the lower part or lower end of the rise pipe and also to the lower part or lower end of the ground hole such that the heat transfer from the primary working fluid is decreased or minimized.

The rise pipe and the drain pipe may be arranged coaxially such that the rise pipe is arranged inside the drain pipe. The first thermal insulation decreases or minimizes heat transfer between the rise pipe and the drain pipe along the length which the first thermal insulation extends. The rise pipe may be arranged inside the drain pipe such that the rise pipe extends an extension distance out from the lower end of the drain pipe.

The first pump may be a reversible pump arranged to pump the primary working fluid in a direction downwards the rise pipe and upwards the drain pipe, or in direction downwards the drain pipe and upwards the rise pipe. The geothermal heat exchanger may further comprise a control unit connected to the first pump and arranged to control the operation direction of the reversible first pump.

Alternative, the geothermal heat exchanger may comprise a second pump arranged to pump the primary working fluid in a direction downwards the drain pipe and upwards the rise pipe. The geothermal heat exchanger may also comprise a control unit connected to the first pump and to the second pump and arranged to control the operation of the first pump and the second for setting the circulation direction of the primary working fluid.

The rise pipe an evacuated tube comprising a vacuum layer surrounding the flow channel of the rise pipe. The vacuum layer arranged to form the first thermal insulation.

Evacuated tube provides high efficiency thermal insulation minimizing heat transfer from the primary working fluid.

Alternative, or additionally, the rise pipe may comprise an insulation material layer on the outer surface of the rise pipe. The insulation material layer may be arranged to form the first thermal insulation. The insulation layer may be altered in the length direction of the first pipe such that the thermal insulation efficiency or thermal conductivity from the first pipe may be altered.

The first thermal insulation may extend along the entire length of the rise pipe. This is decreases the heat exchange along the entire length of the rise pipe. Alternatively, the first thermal insulation may extend from the upper end of the rise pipe towards the lower end of the rise pipe along at least 50% of the length of the rise pipe or at least ⅔ of the length of the rise pipe. Further alternatively, the first thermal insulation may extend from a predetermined distance from the lower end of the rise pipe upwards along the rise pipe. The predetermined distance from the lower end of the rise pipe may be at least 10% of the length of the rise pipe or at least 20% of the length of the rise pipe. Yet alternatively, the first thermal insulation may extend along the rise pipe between the upper end and the lower end of the rise pipe and from a predetermined distance from the lower end of the rise pipe towards the upper end of the rise pipe along the rise pipe and from a predetermined distance from the upper end of the rise pipe towards the lower end of the rise pipe. Therefore, heat transfer from the primary working fluid circulating downwards the rise pipe occurs at the lower end or lower part of the rise pipe, and thus at the lower part of the ground hole.

The thermal conductivity of the first thermal insulation may be uniform in a direction along the rise pipe. This may be achieved with uniform first thermal insulation in the direction along the rise pipe.

Alternatively, the thermal conductivity of the first thermal insulation may be arranged to decrease in the direction towards the lower end of the rise pipe. The thickness of the first thermal insulation may decrease in the direction and towards the lower end of the rise pipe such that the thermal conductivity of the first thermal insulation decreases in the direction towards the lower end of the rise pipe. The decreases thermal conductivity may also be achieved the first thermal insulation comprising at least two different thermal insulation materials arranged to the rise pipe such the thermal conductivity of the first thermal insulation decreases in the direction towards the lower end of the rise pipe.

The present invention further relates to a geothermal heat arrangement comprising a ground hole provided into the ground and extending downwards from the ground surface, and a piping arrangement. The piping arrangement comprises a rise pipe having a lower end and arranged into the ground hole and a drain pipe having a lower end. The lower end of the rise pipe and the lower end of the drain pipe may be arranged in fluid communication with each other for circulating the primary working fluid in a ground hole. The rise pipe may be provided with a first thermal insulation surrounding the rise pipe along at least part of the length of the rise pipe. The arrangement further comprises a first pump connected to the piping arrangement and arranged to circulate the primary working fluid in the rise pipe, and a heat exchange connection in connection with the piping arrangement for secondary heat exchange with the primary working fluid.

The heat exchange connection may be any heat source capable of releasing thermal energy or heat energy to the primary working fluid, and/or capable releasing thermal energy to the primary working fluid such that the temperature of the primary working fluid may be elevated. The heat exchange connection is arranged or provided to or in connection with the piping arrangement outside the ground hole. This means that the heat exchange connection is provided to the piping arrangement outside the ground hole between the rise pipe and the drain pipe. The heat exchange connection may comprise a heat pump, heat exchanger or the like device arranged to provide heat exchange with the primary working fluid flowing in the piping arrangement. The heat exchange connection may be a building heat exchange connection such that the geothermal heat exchanger is arranged to receive thermal energy from or release energy to the building. Alternatively, the heat exchange connection may be heat source heat exchange connection. The heat source may be an industrial heat source releasing excess or waste heat, energy plant heat connection, district heating connection or some heat source connection such as data centre waste heat connection.

In a preferred embodiment, the geothermal heat arrangement comprises a heat pump for providing the heat exchange connection. Heat pump is capable of releasing thermal energy to the primary working fluid and also to receive thermal energy from the heat pump or from the secondary working fluid in the heat pump.

According to the present invention, the first pump is arranged to circulate the primary working fluid in a direction towards the lower end of the ground hole in the rise pipe and towards the ground surface in the drain pipe. Accordingly, the primary working fluid and the thermal energy of the primary working fluid may be transported to the lower end and part of the ground hole.

The rise pipe may an evacuated tube comprising a vacuum layer surrounding the flow channel of the rise pipe. The vacuum layer may be arranged to form the first thermal insulation. The evacuated tube provides excellent thermal insulation allowing efficiently prevent thermal energy from escaping from the primary working fluid in the rise pipe. Alternatively, the rise pipe may comprise an insulation material layer on the outer surface or on the inner surface of the rise pipe. The insulation material layer may be arranged to form the first thermal insulation. The thermal insulation material layer may be altered along the length direction of the rise pipe.

The first thermal insulation may extend along the rise pipe from ground surface towards the lower end of the ground hole and to at least 50% of the depth of the ground hole or to at least ⅔ of the depth of the ground hole. Alternative, the first thermal insulation may extend from a predetermined distance from the lower end of the ground hole upwards along the rise pipe. The predetermined distance from the lower end of the ground hole may be at least 10% of the depth of the ground hole or at least 20% of the depth of the ground hole.

The thermal conductivity of the first thermal insulation may be uniform in a direction along the ground hole. This may be achieved with the evacuated tube or with uniform insulation material layer in the direction along the ground hole. This allows efficient transport of the thermal energy to the lower part of the ground hole.

The thermal conductivity of the first thermal insulation may also decrease in the direction towards the lower end of the ground hole. This may be achieved such that the thickness of the first thermal insulation decreases in the direction towards the lower end of the ground hole such that the thermal conductivity of the first thermal insulation decreases in the direction towards the lower end of the ground hole. Alternatively, the first thermal insulation may comprise at least two different thermal insulation materials arranged to the rise pipe such the thermal conductivity of the first thermal insulation decreases in the direction towards the lower end of the ground hole. This may allow longer heat transfer time for the primary working fluid in the ground hole in wider area and savings in the thermal insulation material.

The first pump may be a reversible pump arranged to pump the primary working fluid in a direction towards the lower end of the ground hole in the rise pipe and upwards towards the ground surface in the drain pipe, or towards the lower end of the ground hole in the drain pipe and upwards towards the ground surface in the rise pipe. The geothermal heat arrangement may further comprise a control unit connected to the first pump and arranged to control the operation direction of the reversible first pump. This provides a simple structure in which one pump may be used for operating the Alternatively, the geothermal heat arrangement may comprise a second pump arranged to pump the primary working fluid in a direction towards the lower end of the ground hole in the drain pipe and upwards towards the ground surface in the rise pipe. The geothermal heat arrangement may further comprise a control unit connected to the first pump and to the second pump arranged to control the operation of the first pump and the second for setting the circulation direction of the primary working fluid. Thus, the first and second pump may be operated non-simultaneously for setting the desired circulation direction of the primary working fluid.

The control unit may be connected to heat exchange connection and arranged to operate the first pump or the first and second pump in response to the operation condition of the heat exchange connection. Alternatively, the geothermal heat arrangement comprises a timer connected to the control unit and the control unit may be arranged to operate the first pump or the first and second pump in response to the timer input from timer. Further, the geothermal heat arrangement may comprise at least one temperature sensor connected to the control unit and the control unit may be arranged to operate the first pump or the first and second pump in response to the temperature input from temperature sensor. Further, alternative, the control unit may be connected with a data transfer connection to an external data service and that the control unit may be arranged to operate the first pump or the first and second pump in response to the data input from the external data service. Accordingly, the operation of the first or first and second pump and the geothermal heat arrangement may be controlled in response to the predetermined thermal conditions, predetermined operating schedule or in response to data input from the external data service.

The vertical rise pipe may be arranged inside the drain pipe inside the ground hole. Further, the ground hole may form the drain pipe or at least part of the drain pipe and the rise pipe is arranged inside the ground hole. When the rise pipe is arranged inside the drain pipe the cross-sectional area of the ground hole is efficiently used and the geothermal heat transfer may be efficiently utilized. This is especially advantageous in ground holes having depth equal to or greater than 300 m.

In one embodiment, the ground hole may form at least part of the drain pipe for circulating the primary working fluid in the ground hole.

Alternatively, the piping arrangement may comprise a separate drain pipe having a lower end arranged into the ground hole. The lower end of the rise pipe and the lower end of the separate drain pipe may be arranged in fluid communication with each other for circulating the primary working fluid in the ground hole, the rise pipe being arranged inside the separate drain pipe.

In a further alternative embodiment, the piping arrangement may comprise a separate drain pipe having a lower end arranged into the ground hole. The lower end of the rise pipe and the lower end of the separate drain pipe are arranged in fluid communication with each other for circulating the primary working fluid in the ground hole. The rise pipe is further arranged inside the separate drain pipe in the ground hole, and the rise pipe extends an extension distance out from the lower end of the drain pipe towards the lower end of the ground hole.

In a yet alternative embodiment, the piping arrangement may comprise a separate drain pipe having a lower end arranged into the ground hole. The lower end of the rise pipe and the lower end of the separate drain pipe are arranged in fluid communication with each other for circulating the primary working fluid in the ground hole. The separate drain pipe extends from the ground surface into the ground hole to a free distance from the lower end of the ground hole such that the ground hole forms the drain pipe along the free distance from the lower end of the ground hole.

Furthermore, the ground hole may also form substantially the whole the drain pipe and the rise pipe is arranged inside the ground hole.

Further, the rise pipe may be arranged inside the drain pipe in the ground hole such that the rise pipe extends an extension distance out from the lower end of the drain pipe towards the lower end of the ground hole. Alternatively, the drain pipe may extend from the ground surface into the ground hole to a free distance from the lower end of the ground hole such that the ground hole may form the along the free distance from the lower end of the ground hole. Accordingly, the ground hole may form at least part of the drain pipe and the rise pipe is arranged inside the ground hole. This way, the ground hole forms the drain pipe at the lower end of the ground hole such that the heat transfer between the primary working fluid and the ground surrounding the lower end of the ground hole is maximized as they are in direct contact.

The depth of the ground hole may be at least 300 m, or at least 500 m, or between 300 to 3000 m or between 300 to 5000 m. In the present invention the geothermal heat exchanger, the geothermal heat arrangement and the method are especially suitable to be used in connection with deep ground holes.

The arrangement may further comprise a heat pump connected to the piping arrangement and arranged to provide the heat exchange connection for the secondary heat exchange with the primary working fluid.

Alternatively, the arrangement may comprise a heat pump connected to the piping arrangement and arranged to provide the heat exchange connection for the secondary heat exchange with the primary working fluid. The heat pump is arranged to release thermal energy to the primary working fluid for heating the primary working fluid and the first pump is arranged to circulate the heated primary working fluid in the direction towards the lower end of the ground hole in the rise pipe. Thus, the heat pump is operated in cooling mode in which thermal energy is released to the primary working fluid or the primary working fluid extracts thermal energy in the heat pump.

Further alternatively, the arrangement may comprise a heat exchanger connected to the piping arrangement and arranged to provide the heat exchange connection for the secondary heat exchange with the primary working fluid.

In a yet alternative embodiment, the arrangement may comprise a heat exchanger connected to the piping arrangement and arranged to provide the heat exchange connection for the secondary heat exchange with the primary working fluid. The heat exchanger is arranged to release thermal energy to the primary working fluid for heating the primary working fluid, and the first pump is arranged to circulate the heated primary working fluid in the direction towards the lower end of the ground hole in the rise pipe.

Additionally, the heat pump may be arranged to extract thermal energy from the primary working fluid for cooling the primary working fluid, and the first pump may be arranged to circulate the primary working fluid in the direction upwards the rise pipe from the lower end of the ground hole. Thus, the heat pump is operated in heating mode in which thermal energy is released from the primary working fluid in the heat pump.

The present invention further relates a method for charging thermal energy to ground or ground hole of geothermal heat arrangement. The method comprises circulating a primary working fluid in a geothermal heat exchanger comprising a piping arrangement having a rise pipe arranged into a ground hole and a drain pipe, the rise pipe and the drain pipe being arranged in fluid communication with each other for circulating a primary working fluid in the ground hole for geothermal heat exchange in the ground hole. The ground hole extends from the ground surface into the ground and has a lower end. The rise pipe is provided with a first thermal insulation surrounding the rise pipe along at least part of the length of the rise pipe. The method further comprises providing heat exchange between the primary working fluid circulating in the geothermal heat exchanger and a secondary working fluid. The method comprises operating the geothermal heat exchanger in a charging mode in which the primary working fluid receives thermal energy from the secondary working fluid in the heat exchange between the primary working fluid circulating in the geothermal heat exchanger and the secondary working fluid, and circulating the primary working fluid in the charging mode in a downwards direction in the rise pipe and in a direction upwards in the drain pipe for transporting thermal energy to the lower end of the ground hole and for releasing thermal energy from the primary working fluid to the ground at the lower end of the ground hole. The method allows transporting thermal energy from the secondary working fluid to the lower end of the ground hole and charging ground surrounding the lower end of the ground hole with the thermal energy by heat exchange from the primary working fluid.

The method may further comprise operating the geothermal heat exchanger in an extraction mode in which the primary working fluid releases thermal energy to the secondary working fluid in the heat exchange between the primary working fluid circulating in the geothermal heat exchanger and the secondary working fluid, and circulating the primary working fluid in the extraction mode in a downwards direction in the drain pipe and in a direction upwards in the rise pipe for transporting thermal energy from the ground hole and for releasing thermal energy from the primary working fluid to the secondary working fluid in the heat exchange between the primary working fluid circulating in the geothermal heat exchanger and a secondary working fluid. Accordingly, the thermal energy charged to the lower end of the ground hole may be extracted from the ground and used for heating the secondary working fluid.

The method may further comprise controlling the operation of the geothermal heat exchanger between the extraction mode and the charging mode based on temperature measurement in the ground or in the ground hole. Alternatively, the method may comprise controlling the operation of the geothermal heat exchanger between the extraction mode and the charging mode based on temperature measurement of the primary working fluid in the first or drain pipe or in the rise pipe and the drain pipe, or based on temperature measurement of the secondary working fluid. Yet alternatively, the method may comprise controlling the operation of the geothermal heat exchanger between the extraction mode and the charging mode based on temperature measurement inside a building or in ambient atmosphere of the building, the geothermal heat exchanger being provided in connection with the building. Further, the method may comprise controlling the operation of the geothermal heat exchanger between the extraction mode and the charging mode based on a predetermined operation schedule on an external input data from an external data service. The external input data may be for example weather data from an external weather service or electrical power data or thermal energy data from a power plant or from electrical power network or from thermal energy network. Therefore, the method may be used in extraction mode or in charging mode based on operating conditions or temperature conditions or other external conditions.

The method may also comprise utilizing waste heat of ventilation system of building as a source for heating the secondary working fluid, or utilizing thermal energy of an industrial plant, power plant or factory as a source for heating the secondary working fluid, or utilizing excess thermal energy of a data server facility or an urban heat source as a source for heating the secondary working fluid, or producing thermal energy by utilizing wind power, water power or solar power for heating the secondary working fluid.

The method may further comprise providing the heat exchange between the primary working fluid circulating in the geothermal heat exchanger and a secondary working fluid in a heat pump. The method may then comprise operating the heat pump in cooling mode in which the primary working fluid receives thermal energy from the secondary working fluid in the heat pump and operating the geothermal heat exchanger in the charging mode. Alternatively, the method may comprise operating the heat pump in heating mode in which the secondary working fluid receives thermal energy from the primary working fluid in the heat pump and operating the geothermal heat exchanger in the extraction mode. Further alternatively, the method may comprise operating the heat pump in cooling mode in which the primary working fluid receives thermal energy from the secondary working fluid in the heat pump and operating the geothermal heat exchanger in the charging mode, and operating the heat pump in heating mode in which the secondary working fluid receives thermal energy from the primary working fluid in the heat pump and operating the geothermal heat exchanger in the extraction mode. Accordingly, the combination of the cooling mode and heating mode of the heat pump and the heat charging mode and heat extraction mode of the geothermal heat exchanger, respectively, allows storing thermal energy in the ground hole and utilizing the ground hole heat well.

An advantage of the invention is that it enables transporting heat energy with the primary working fluid to the lower end or lower part of the ground hole with decreased heat exchange or heat loss during the flow of the primary working fluid in the at least partly thermally insulated rise pipe. Therefore, heat energy may be charged to the ground surrounding the ground hole at the lower end of the ground hole. Thus, the present invention enables storing thermal energy to the ground and to the lower end of the ground hole for later extraction.

BRIEF DESCRIPTION OF THE DRAWINGS

The invention is described in detail by means of specific embodiments with reference to the enclosed drawings, in which.

DETAILED DESCRIPTION OF THE INVENTION

Figure 1:
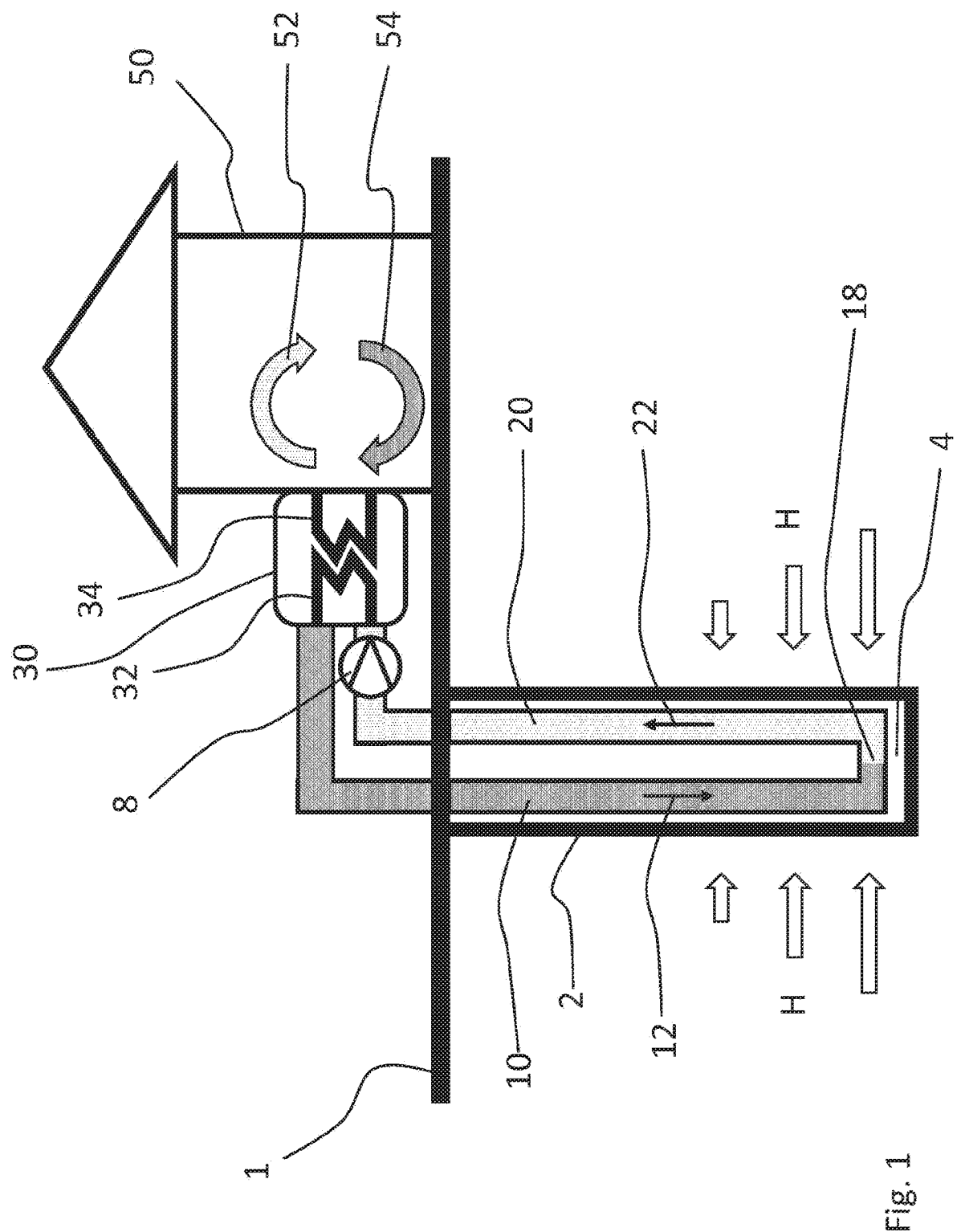
FIG. 1 shows a schematic view prior art ground sourced heat exchanger.

FIG. 1 shows a conventional prior art geothermal heat exchanger and geothermal heat arrangement. The geothermal heat arrangement comprises ground hole 2 or bore hole provided to the ground and extending downwards into the ground from the ground surface 1. The ground hole 2 is formed by drilling. In the context of the present application the depth of the ground hole 2 may be at least 200 m, or at least 300 m, or between 300 m and 3000 m, or between 500 m and 2500 m.

The ground hole may extend to a depth under the water table in the ground, meaning through the water table. Alternatively, the ground hole may extend to a depth above the water table in the ground.

It should be noted that in the figures similar structural part and structures are denoted with same reference numerals and their description is not repeated in relation to every figure.

Further, in the present application the ground hole 2 may be any kind of hole extending into the ground it may be vertical hole, straight vertical or otherwise straight hole extending into the ground in an angle to the ground surface or to the vertical direction. Furthermore, the ground hole 2 may be may have one or more bend and the direction of the ground hole may change one or more times along the length of the ground towards the lower end or bottom of the ground hole. Additionally, it should be noted that shape or form the rise pipe and the drain pipe may preferably conform the shape or form of the ground hole, at least substantially, in order to provide proper installation of the rise pipe and the drain pipe into the ground hole. Preferably, the ground hole extends to a depth as mentioned above, but it may one or more bends along the length or it may be straight.

The ground material at the mower end 4 of the ground hole is usually rock material.

There is a geothermal heat exchanger arranged in connection with the ground hole 2. The geothermal heat exchanger comprises a piping arrangement in which a primary working fluid is circulated. The piping arrangement usually comprises a closed loop piping arranged to provide closed circulation of the primary working fluid. The primary working fluid is usually a liquid, such as water or methanol or ethanol based working fluids. The piping arrangement comprises a rise pipe 10 and a separate drain pipe 20 arranged into the ground hole 2 such that they extend from the ground surface towards bottom 4 of the ground hole 2. The rise pipe and the drain pipe are connected to each other with a connection pipe part 18, or a bend, such that they are in fluid communication with each other at the lower ends of the rise pipe 10 and the drain pipe 20 for circulating the primary working fluid in ground hole 2 between the rise pipe 10 and the drain pipe 20. As shown in FIG. 1, the rise pipe 10 and the drain pipe 20 form U-shaped pipe structure. There may be one or more U-shaped pipe structure or one or more rise pipes 10 and drain pipe 20 arranged into the same or different ground holes 2.

The geothermal heat exchanger further comprises a first pump 8 arranged to the piping arrangement 10, 20 for circulating the primary working fluid in the piping arrangement. The first pump 8 may be any kind of known pump capable of circulating the primary working fluid.

The geothermal heat exchanger is further connected to a heat pump 30 in which heat exchange is carried out between primary working and a secondary working fluid. In the heat pump 30 the primary working fluid flows in a primary circuit 32 and the secondary working fluid flows in a secondary circuit 34 and the heat exchange is carried between the primary circuit 32 and the secondary circuit 34. The heat pump 30 may be any kind prior art commonly known heat pump.

In FIG. 1, the geothermal heat exchanger and the heat pump 30 are arranged in connection with a building 50. The geothermal heat exchanger is used for heating or cooling ventilation air of the building and thus the ventilation air forms the secondary working fluid which is supplied to the heat pump 30. The primary working fluid is pumped along the rise pipe 10 as cold primary flow 12 downwards towards the bottom end 4 of the ground hole 2. The temperature of the ground increases in depth direction and towards the bottom end 4 of the ground hole 2. Accordingly, the primary working fluid extracts thermal energy H from the ground in the ground hole 2 and flows upwards towards the ground surface 1 along the separate drain pipe 20 as heated primary flow 22. The heated primary flow 22 enters the heat pump 30 and releases thermal energy to cold secondary flow 54 from the building 50. Thus, temperature the primary working fluid decreases and the primary working fluid leaves the heat pump 30 as cold primary flow 12 for new circulation. Similarly, the temperature of the secondary working fluid increases in the heat pump 30 and the secondary working fluid leaves the heat pump as heated secondary flow 52.

The process and circulation of the primary and secondary flows may be changed from the heating mode, as described above, to cooling mode in which the primary and secondary flows and also heat transfers are reversed for cooling the ventilation air of the building 50.

Figure 2:
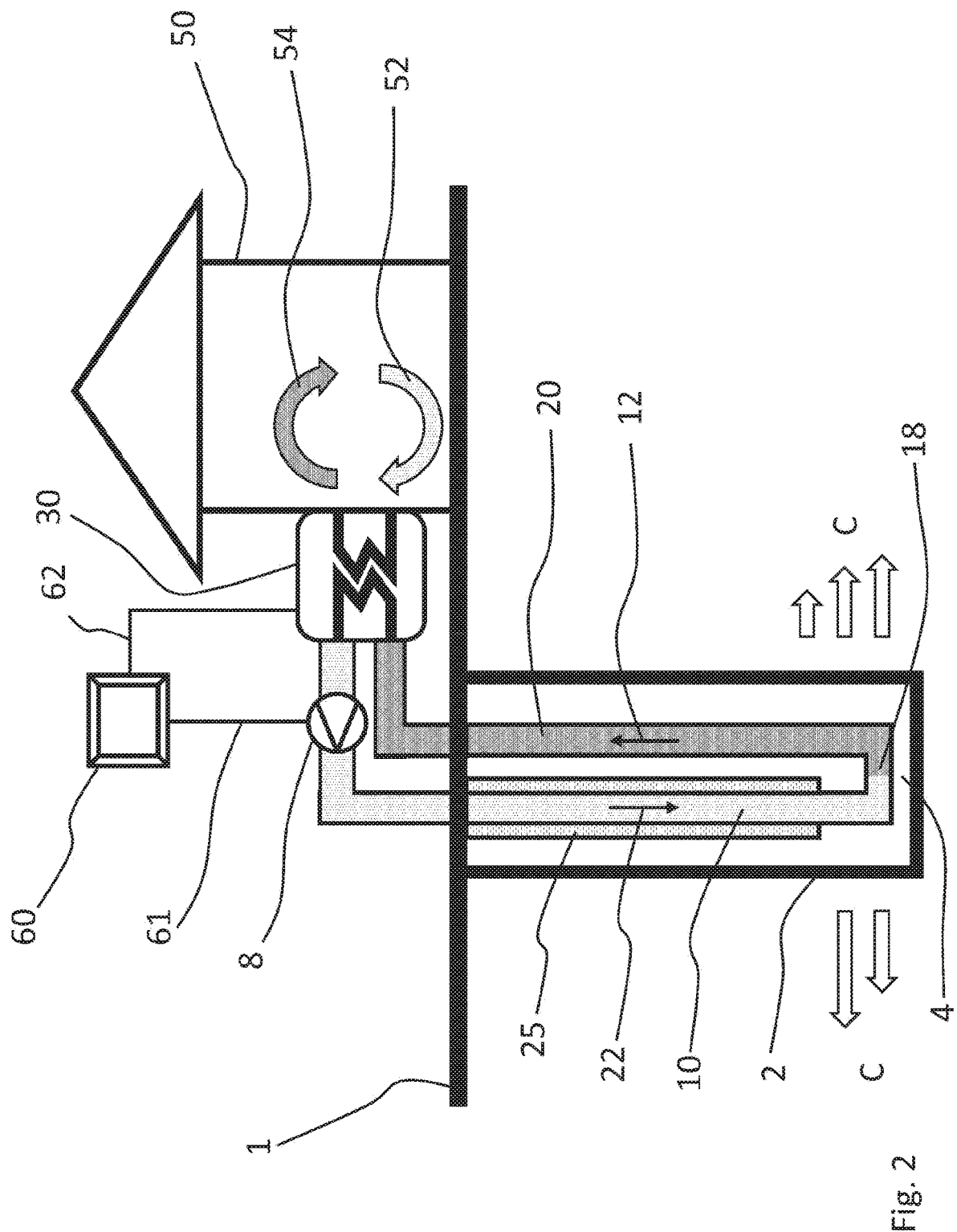
FIG. 2 shows a schematic view of one embodiment of a ground sourced heat exchanger arrangement according to the present invention.

FIG. 2, shows one embodiment of the present invention. In the present invention, the geothermal heat exchanger is arranged to charge thermal energy to the ground surrounding the ground hole 2, especially at the lower end 4 of the ground hole 2. The structure of the geothermal heat exchanger and the geothermal heat arrangement correspond embodiment of FIG. 1.

Accordingly, hot secondary flow 52 is arranged to release thermal energy to the primary working fluid in the heat pump 30 such that cold secondary flow 54 leaves the heat pump 30 and the temperature of the secondary working fluid decreases in the heat pump 30. The first pump 8 is arranged to circulate the primary working fluid in a direction downwards rise pump 10 as heated primary flow 22, and upwards the drain pipe 20 as cold primary flow as the primary working fluid releases thermal energy C from the heated primary flow to the ground.

As shown in figures, the heat pump or heat exchange connection is provided to the piping arrangement or in connection with the piping arrangement outside the ground hole 2. The piping arrangement may provide a closed circulation piping for the primary working fluid and thus there is connection piping connection the rise pipe 10 and the drain pipe 20 outside the ground hole 2 for providing the closed circulation piping.

The heat pump 30 may also be any other heat exchange connection such as a secondary heat exchanger. The heat connection 30 provided heat exchange with the primary working fluid and a secondary working fluid. Furthermore, it should be noted that there may be more than one heat exchange connection provided in connection with the piping arrangement.

In one embodiment, the hat exchange connection 30 may a heat source connection for releasing thermal energy to the primary working fluid and further into the ground.

According to the present invention the rise pipe 10 is provided with a first thermal insulation 25 surrounding the rise pipe 10 along at least part of the length of the rise pipe 10. The first thermal insulation 25 extends from the ground surface 1 along the rise pipe 10 downwards towards the bottom end 4 of the ground hole 2. The first thermal insulation decreases heat transfer from the heated primary flow 22 of the primary working fluid along the rise pipe 10 to the ground surround the ground hole 2 and to the drain pipe 20 and the cold primary flow 12 in the drain pipe 20.

It should be noted that the first thermal insulation 25 may also extend from above ground surface 1, from the upper end 7 of the rise pipe 10 or from the heat pump 30 towards the lower end 4 of the ground hole 2.

The rise pipe 10 may comprise an insulation material layer on the outer surface of the rise pipe 10, or on the inner surface of the rise pipe 10. The insulation material layer is arranged to form the first thermal insulation 25. The insulation material layer may be formed from any known insulation material and the present invention is not limited to any particular insulation material.

Furthermore, it should be noted that the heat pump 30 may be any known type of heat pump or any kind of heat exchange connection in which the primary working fluid may receive thermal energy outside the ground hole 2 and to which the geothermal heat exchanger or the piping arrangement thereof may be connected.

In the embodiment of FIG. 2, the rise pipe 10 and the drain pipe 20 are arranged at a distance from each other and connected to each other with a connection pipe part 18, or bend, at the lower ends of the rise pipe 10 and the drain pipe 20. In other words, the rise pipe 10 and the drain pipe 20 form a U-shaped pipe structure. However, it should be noted that the present invention is not limited to any particular pipe structure of the rise pipe 10 and the drain pipe 20 or any number of rise pipes 10 and drain pipe 20.

In the embodiment of FIG. 2, the first thermal insulation extends along the rise pipe 10 to distance from the lower end of the rise pipe 10 or the connection pipe part 18 or the bend.

The thermal insulation 25 together with the heated primary flow 22 provided with the fist pump 8 in the rise pipe 10 decreases or minimizes heat transfer from the heated primary flow 22 in the rise pipe 10 such that the primary working fluid may be transported in heated form or in elevated temperature to the lower end of the first pipe 10 and the lower end 4 of the ground hole 2. Accordingly, the primary working fluid releases thermal energy C at elevated temperature to the ground surrounding the ground hole 2 at the lower end of the ground hole 2 and thus charges thermal energy to the ground for later use.

The first pump 8 may a reversible pump arranged to pump the primary working fluid in a direction downwards the rise pipe 10 and upwards the drain pipe 20, or alternatively in direction downwards the drain pipe 20 and upwards the rise pipe 10. The first one is the charging mode in which thermal energy is charged to the ground and the second is a reverse mode, meaning extraction, mode in which charged thermal energy is extracted from the ground. The geothermal heat exchanger or the geothermal heat arrangement may further comprise a control unit 60 connected to the first pump 8 with a pump connection 61 and arranged to control the operation direction of the reversible first pump 8 between the charging mode and the extraction mode.

The control unit 60 may also be connected to the heat exchange connection 30 with an information connection 62 and arranged to operate the first pump 8 in response to the operation condition of the heat exchange connection 30, for example temperatures of the primary and/or secondary fluid in the heat exchange connection 30.

Figure 3:
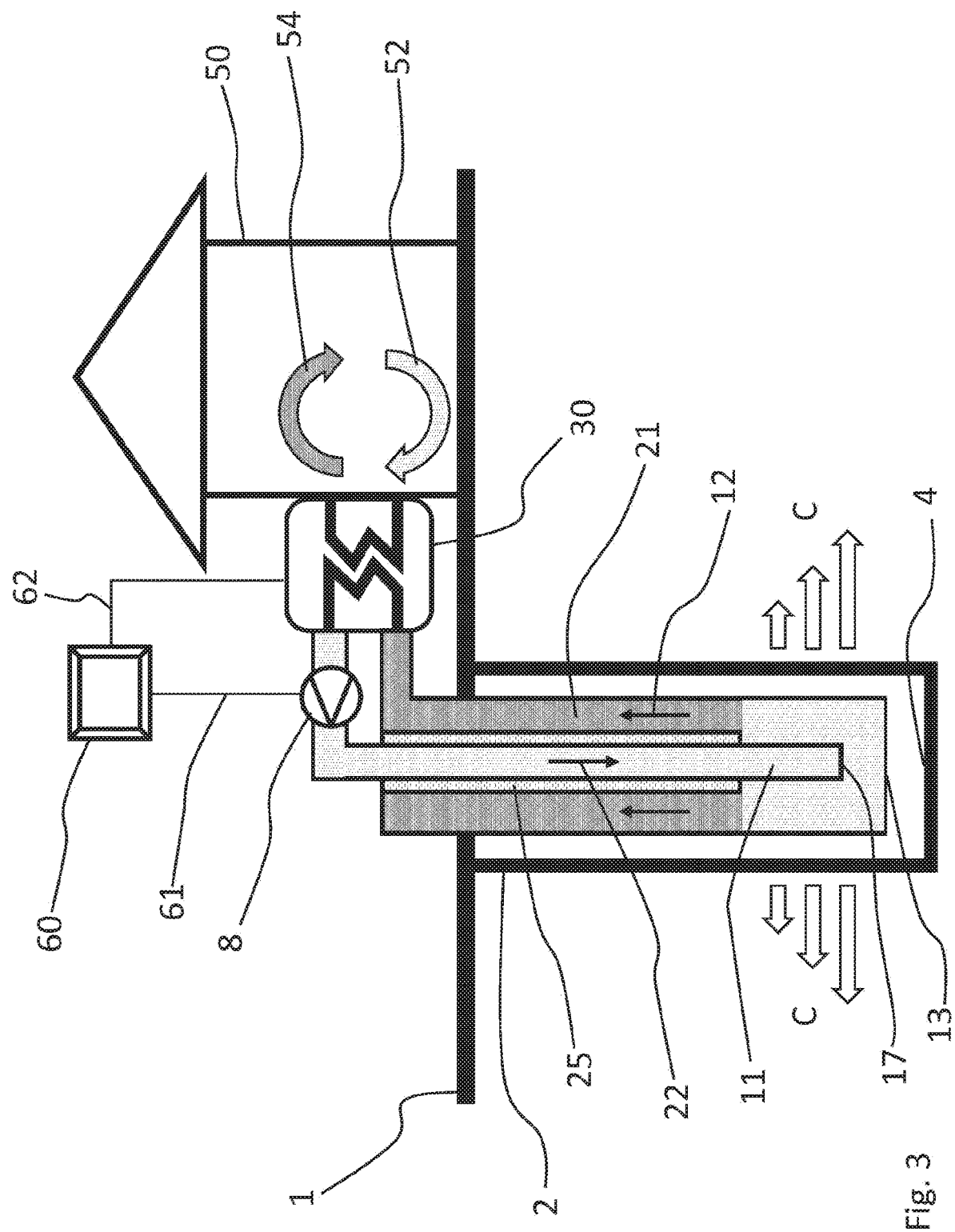
FIG. 3 shows a schematic view of another embodiment of a ground sourced heat exchanger arrangement according to the present invention.

FIG. 3 shows another embodiment in which the rise pipe 11 is arranged inside the separate drain pipe 21. Otherwise the embodiment of FIG. 3 corresponds the embodiment of FIG. 2. In this embodiment the rise pipe 11 and the drain pipe 21 are arranged nested within each other or they may be arranged coaxially within each other such that the rise pipe 11 is inside the drain pipe 21. The heated primary flow 22 flows downwards in the rise pipe 11 having the first thermal insulation 25 and flows out of the rise pipe 11 from the open lower end 17 of the rise pipe 11 into the drain pipe 21 surrounding the rise pipe 11. The primary working fluid releases thermal energy C to the ground at the lower end 13 of the drain pipe 21 or at the lower end 4 of the ground hole 2, and then flows as cold primary flow 12 upwards the drain pipe 21. The first thermal insulation 25 decreases or minimizes heat transfer between the rise pipe 11 and the drain pipe 21 and between the heated flow 22 and the cold flow 12.

As shown in FIG. 3, the thermal insulation 25 extends to a distance from the lower end 17 of the rise pipe 17.

In the embodiment of FIG. 3, the drain pipe 21 is pipe having a closed lower end 13 and extending inside the ground hole 2 to the lower end 4 of the ground hole in the vicinity thereof. Accordingly, the rise pipe 11 is entirely inside the drain pipe 21 in the ground hole 2 and the primary working fluid does not come in direct contact with the ground.

Figure 4:
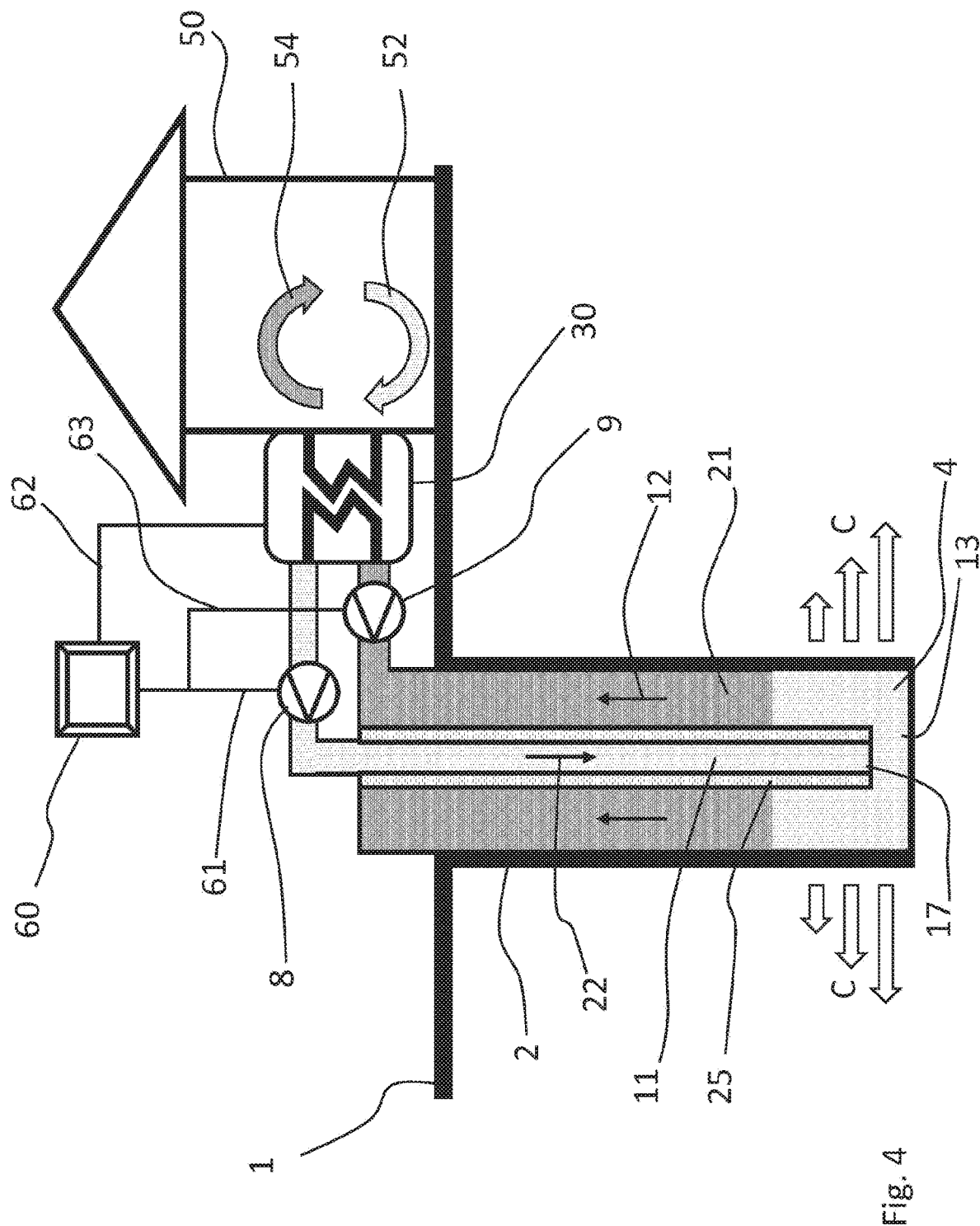
FIG. 4 shows a schematic view of still another embodiment of a ground sourced heat exchanger arrangement according to the present invention.

FIG. 4 shows an embodiment which corresponds the embodiment of FIG. 3. In this embodiment, the first thermal insulation 25 extends from the ground surface 1 to the lower end 17 of the rise pipe 11. Thus, the first thermal insulation 25 may extend along the entire length of the rise pipe 11, at least inside the ground hole 2 or the drain pipe 21. The first thermal insulation 25 may also extend along the entire length of the rise pipe 11.

In this embodiment, the rise pipe 11 may be an evacuated tube comprising a vacuum layer surrounding the flow channel of the rise pipe 11. Thus, the vacuum layer is arranged to form the first thermal insulation 25. It may also be provided with any other insulating material.

In this embodiment, the first thermal insulation extends along the rise pipe 11 to the lower end 17 of the rise pipe 11.

The geothermal heat exchanger of FIG. 4 comprises a second pump 9 arranged to pump the primary working fluid in a direction downwards the drain pipe 21 and upwards the rise pipe 11, when the geothermal heat exchanger and the geothermal heat arrangement are in heat extraction mode. Accordingly, the first pump 8 is arranged to operate in the heat charging mode and the second pump 9 in the heat extraction mode.

The control unit 60 may be connected to the first pump 8 and to the second pump 9 and arranged to control the operation of the first pump 8 and the second 9 for setting the circulation direction of the primary working fluid to the heat charging or extraction mode, optionally.

In FIG. 4, there is no separate drain pipe 21, but the ground hole 2 is arranged to form the drain pipe 21.

Figure 5:
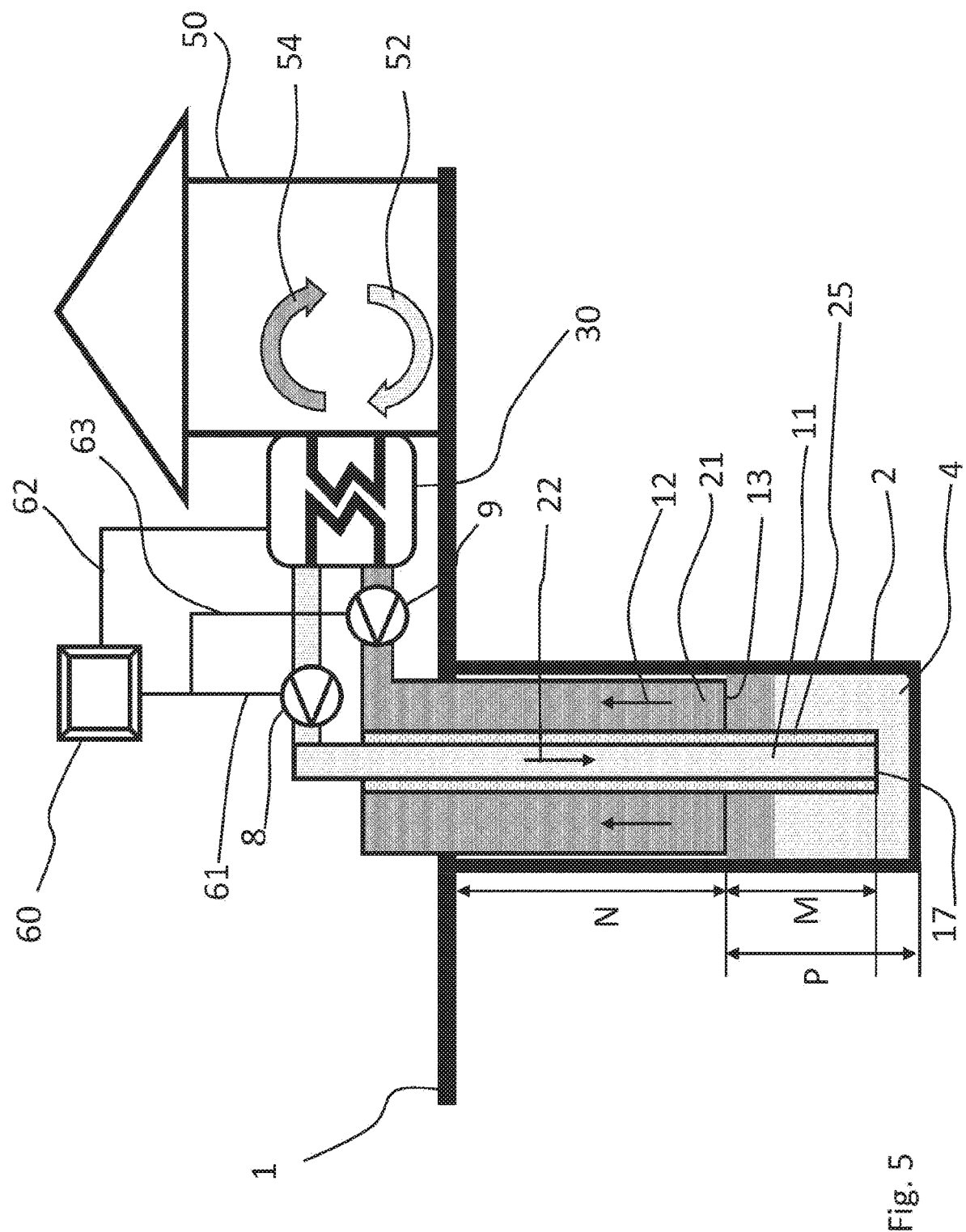
FIG. 5 shows a schematic view of still another embodiment of a ground sourced heat exchanger arrangement according to the present invention.

FIG. 5 shows a modification of the embodiment of FIG. 4. In this embodiment, the rise pipe 11 is arranged inside the drain pipe 21 in the ground hole 2. The separate drain pipe 21 extends from the ground surface 1 into the ground hole 2 along a penetration distance N and to a free distance P from the lower end 4 of the ground hole 2 such that the ground hole 2 forms the drain pipe along the free distance P from the lower end of the ground hole 2.

Furthermore, the rise pipe 11 extends an extension distance M out from the lower end 13 of the separate drain pipe 21 towards the lower end 4 of the ground hole 2. Thus, the rise pipe 11 extends to the free distance P. Thus, in this embodiment the ground hole 2 forms at least part of the drain pipe. The ground hole 2 forms the drain pipe along the free distance P from the lower end 4 of the ground hole 2, or between the lower end 4 of the ground hole 2 and the lower end 13 of the separate drain pipe 21.

The first thermal insulation 25 extends to the lower end 17 of the rise pipe 11. However, the first thermal insulation 25 could also extend only to the lower end 13 of the separate drain pipe 21 or between then lower end 13 of the drain pipe 21 and the lower end 17 of the rise pipe 11.

Figure 6:
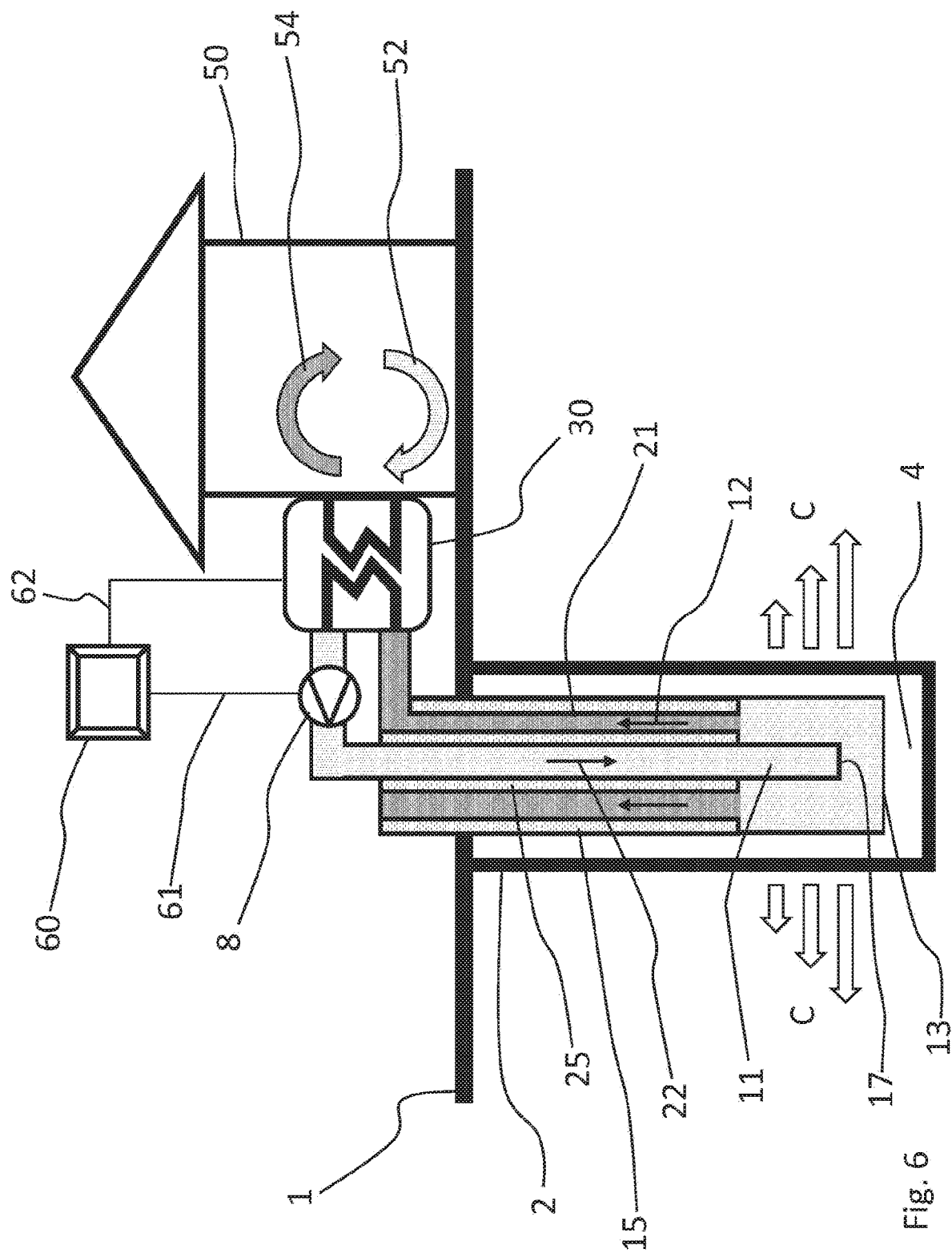
FIG. 6 shows a schematic view of yet another embodiment of a ground sourced heat exchanger arrangement according to the present invention.

FIG. 6 shows an embodiment in which also the drain pipe 21 is also provided with a second thermal insulation 15 surrounding the drain pipe 21 along at least part of the length of the drain pipe 21. The second thermal insulation 15 may be provided in the similar manner as the first thermal insulation 25. Therefore, everything that is descripted concerning the first thermal insulation 25 also apply to the second thermal insulation 15. The second thermal insulation 15 may be provided on the inner surface or on the outer surface of the drain pipe 21. The second thermal insulation 15 may extend along the drain pipe 21 to the lower end 13 of the drain pipe 21 or to a distance from the lower end 13. Thus, the primary working fluid may release thermal energy to the ground only at the lower end 4 of the ground hole 2, or in the vicinity thereof, and the heat exchange between the cold primary flow 12 and the ground and the heated primary flow 22 is decreased. This may prevent the cold primary flow 12 from heating in the upper part drain pipe 21 if the ground is at higher temperature than the cold primary flow at the upper part of the ground hole 2.

Figure 7:
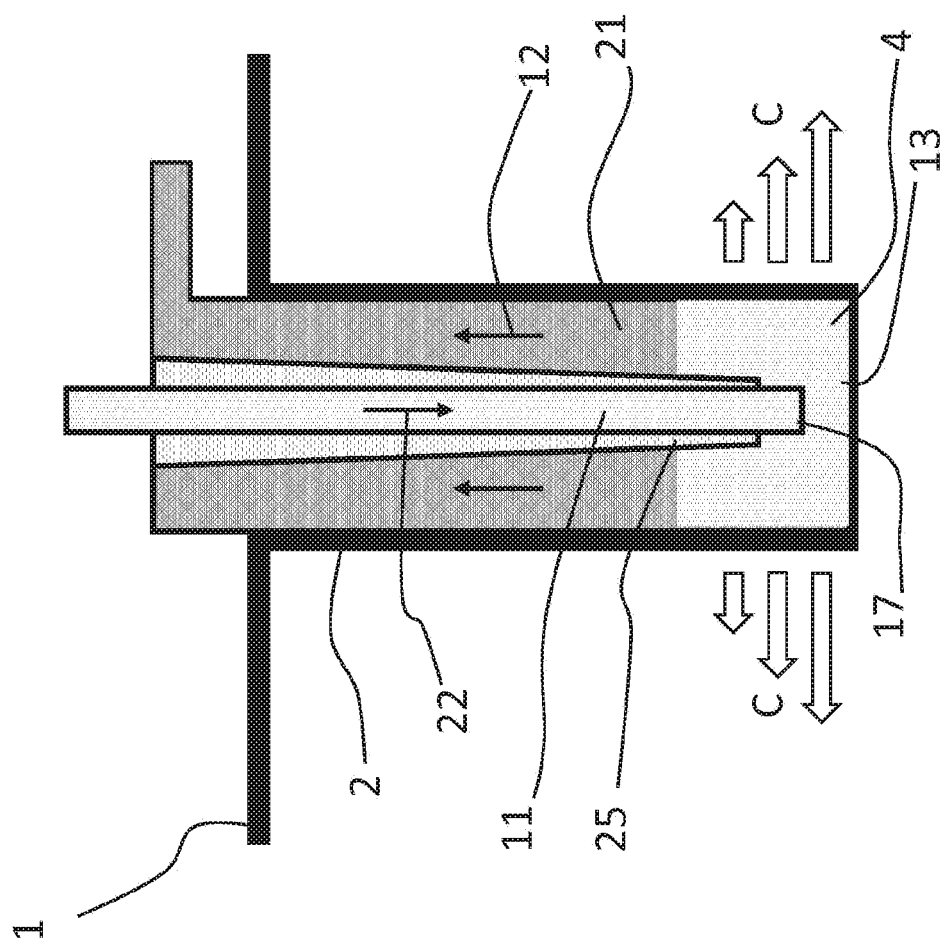
FIG. 7 shows a schematic view of one embodiment of a ground sourced heat exchanger according to the present invention.

In embodiment of FIGS. 2 to 6 the thermal conductivity of the first thermal insulation 25 has been uniform in a direction along the rise pipe 10, 11. FIG. 7 shows an embodiment in which the thermal conductivity of the first thermal insulation 25 decreases in the direction towards the lower end 17 of the rise pipe 11. In this embodiment, thickness of the first thermal insulation 25 is arranged to decrease in the direction towards the lower end 17 of the rise pipe 11 such that the thermal conductivity of the first thermal insulation 25 decreases in the direction towards the lower end 17 of the rise pipe 11. This enables the heated primary flow 22 to gradually increase the heat transfer to the cold primary flow 12 and to the ground as it flows towards the lower end 17 of the rise pipe 11 and the lower end 4 of the ground hole 2. The ground hole 2 forms art least part of the drain pipe 21.

Figure 8:
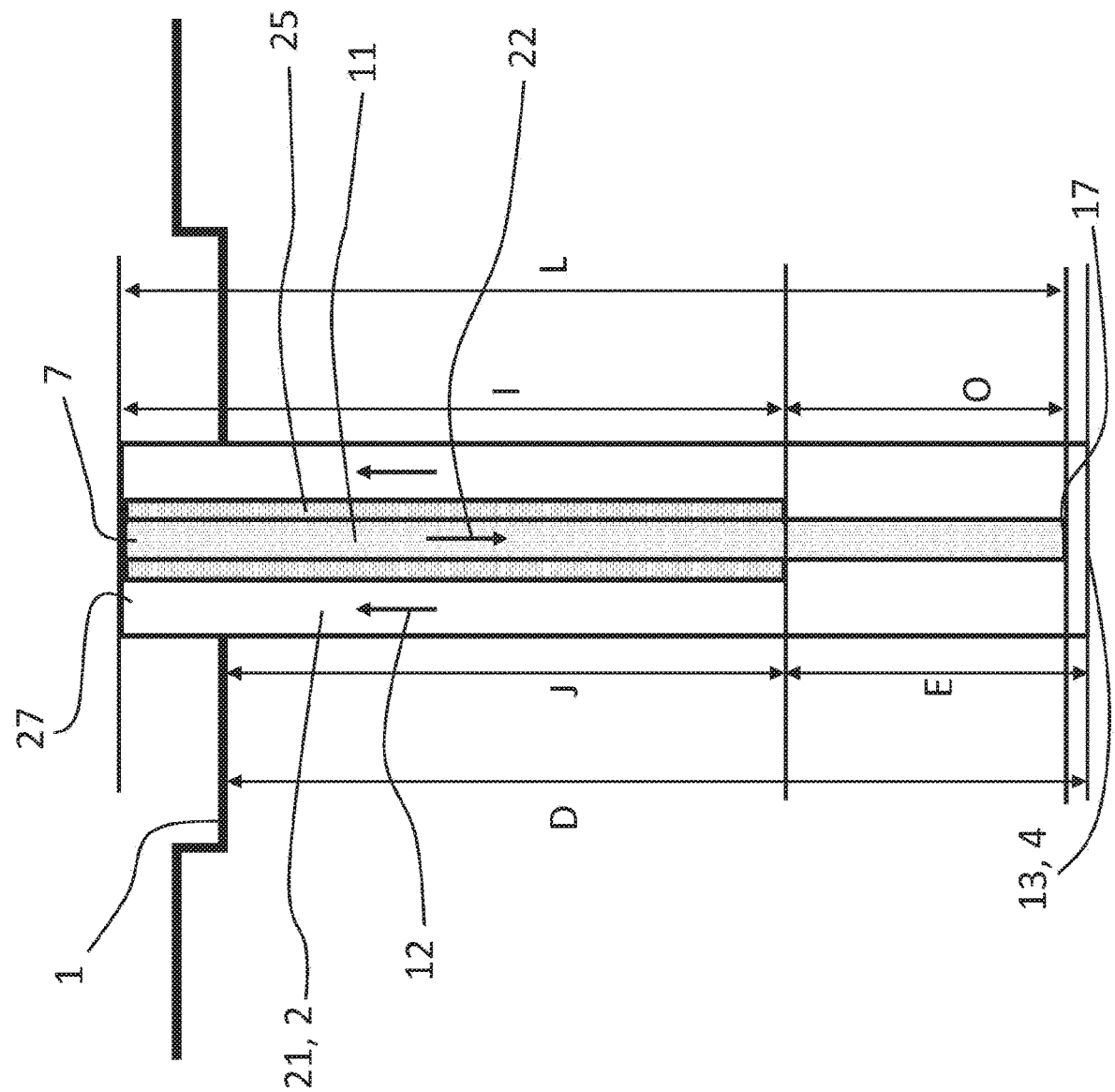
FIG. 8 shows a schematic view and detailed view of a ground sourced heat exchanger according to the present invention.

FIG. 8 shoes schematically the possible dimensions of the first thermal insulation 25. The rise pipe 11 has an upper end 7 and the lower end 17. The drain pipe 21 has an upper end 27 and the lower end 13. The ground hole 2 extends from the ground surface 1 to the lower end 4 of the ground hole 2.

In one embodiment, the first thermal insulation 25 may extend from the upper end 7 of the rise pipe 11 towards the lower end 17 of the rise pipe 11 along at least 50% of the length L of the rise pipe 11 or at least ⅔ of the length L of the rise pipe 11, as denoted with I in FIG. 8.

In another embodiment, the first thermal insulation 25 may extend from a predetermined distance O from the lower end 17 of the rise pipe 11 upwards along the rise pipe 11. The predetermined distance O from the lower end 17 of the rise pipe 11 may be at least 10% of the length L of the rise pipe 11 or at least 20% of the length L of the rise pipe 11.

In a yet alternative embodiment, the first thermal insulation 25 extends along the rise pipe 11 from ground surface 1 towards the lower end 4 of the ground hole 2, or the lower end 13 of the drain pipe 21, and to at least 50% of the depth D of the ground hole 2 or to at least ⅔ of the depth D of the ground hole 2, as denoted with J in FIG. 8.

Further alternatively, the first thermal insulation 25 may extend from a predetermined distance E from the lower end 4 of the ground hole 2, or the lower end 13 of the drain pipe 21, upwards along the rise pipe 11. The predetermined distance E from the lower end 4 of the ground hole 2, or from the lower end 13 of the drain pipe 21, may be at least 10% of the depth D of the ground hole 2 or at least 20% of the depth D of the ground hole 2, or the length of the drain pipe 21.

Figure 9:
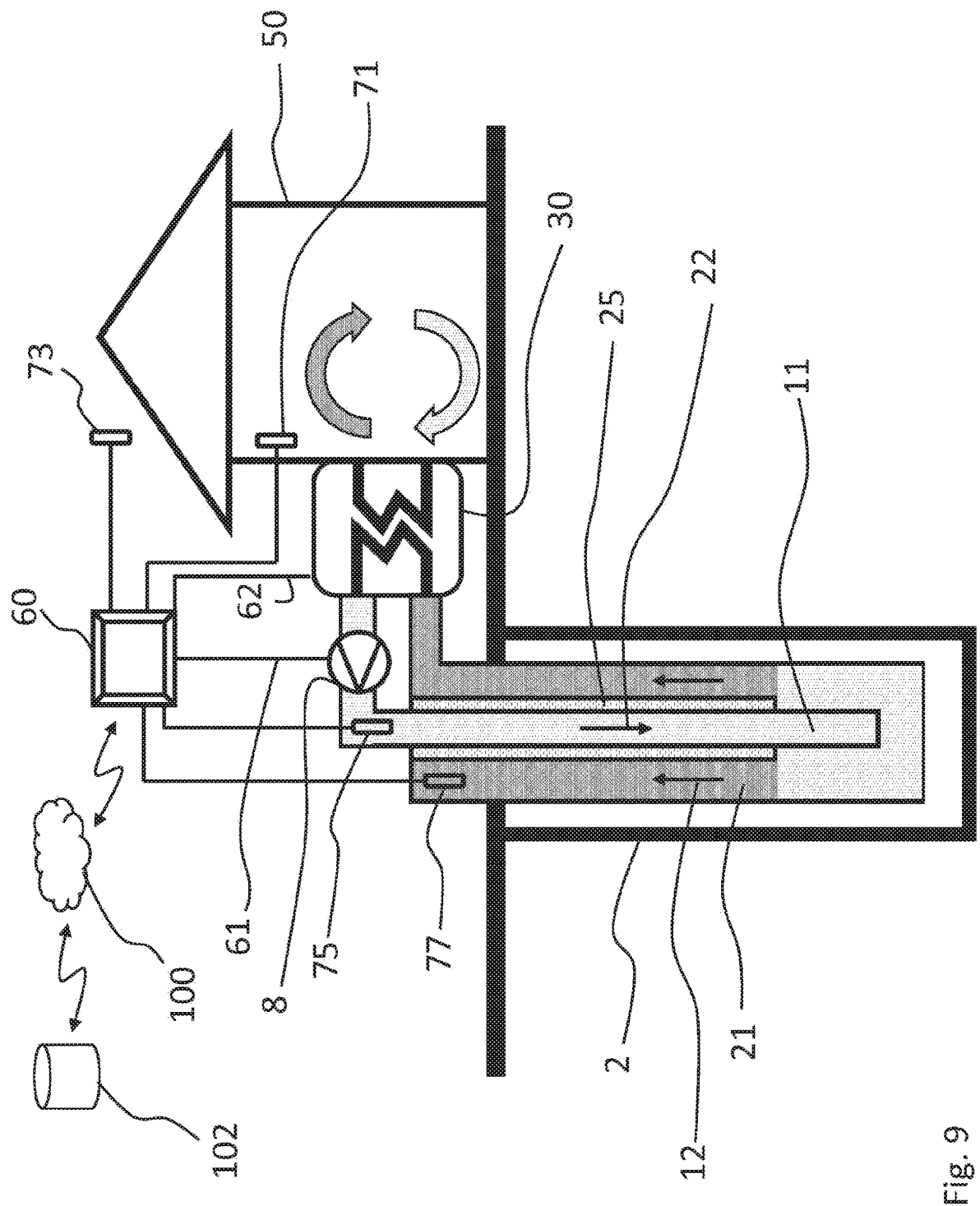
FIG. 9 shows a schematic view of one embodiment of a ground sourced heat exchanger arrangement according to the present invention.

FIG. 9 shows schematically the operation of the control unit 60 for operating the geothermal heat arrangement. The geothermal heat arrangement may comprise one or more temperature sensors 71 for measuring temperature for example inside a building 50, in ambient atmosphere surrounding the building 50, in ventilation system of the building 50 or in any other external location. The at least one temperature sensor 71 may be connected to the control unit 60 and the control unit 60 may be arranged to operate the first pump 8, or the first and second pumps 8, 9, in response to the temperature input from temperature at least one sensor 71.

Alternatively or additionally, the geothermal heat arrangement may comprise one or more sensors 75, 77 arranged to the rise pipe 11 and/or the drain pipe 21. These sensors may be temperature sensors, flow sensors or some other kind of sensors measuring the heated primary flow 22 and the cold primary flow 12. The one or more sensor 75, 77 may be connected to the control unit 60 and the control unit 60 may be arranged to operate the first pump 8, or the first and second pumps 8, 9, in response to the measurement input from one or more sensors 75, 77 in the rise pipe 11 and/or drain pipe 21

The geothermal heat arrangement may also comprise a timer 73 or manual operating equipment connected to the control unit 60. The control unit 60 may arranged to operate the first pump 8, or the first and/or second pump 8, 9, in response to the timer input from timer 73 or manual operating input from the manual operating equipment.

The control unit 60 may also be connected with a data transfer connection 100 to an external data service 102 such that the control unit 60 may be arranged to operate the first pump 8, or the first and/or second pump 8, 9, in response to the data input from the external data service 102. The data transfer connection 100 may be any known kind of wireless or wired data transfer connection, for example internet connection, local area network, mobile communication network or the like. The external service 102 or external database may be any suitable service or database from which the control unit may obtain operating data form controlling the operation of the first pump 8, or the first and second pumps 8, 9.

In the embodiment of FIG. 2 to 9, the heat exchange connection 30 preferably comprises a heat pump 30 connected to the piping arrangement 10, 11, 20, 21 and arranged to provide the heat exchange connection 30 for the secondary heat exchange with the primary working fluid. The heat pump 30 may be arranged to release thermal energy to the primary working fluid for heating the primary working fluid, and the first pump 8 may be arranged to circulate the heated primary working fluid in the direction towards the lower end 4 of the ground hole 2 in the rise pipe 10, 11. This allows transporting thermal energy to the lower end 4 of the ground hole 2 in the insulted rise pipe 10, 11 and charging thermal energy to the ground at the lower end 4 of the ground hole 2. Thus, the heat pump 30 is operated in cooling mode and the geothermal heat exchanger in charging mode. The heat pump 30 may also be arranged to extract thermal energy from the primary working fluid for cooling the primary working fluid, and the first pump 8 is arranged to circulate the primary working fluid in the direction upwards the rise pipe 10, 11 from the lower end 4 of the ground hole 2. Thus, the heat pump 30 is operated in heating mode and the geothermal heat exchanger in extraction mode.

The heat pump 30 may also be replaced with a heat exchanger. However, controlling the operating temperatures in the heat charging and extraction modes is difficult.

The geothermal heat exchanger and the geothermal heat arrangement of the present invention enable utilizing an efficient method for charging thermal energy to the ground and further utilizing the charged thermal energy for later purposes.

Accordingly, the method comprises circulating the primary working fluid in the geothermal heat exchanger and providing heat exchange between the primary working fluid circulating in the geothermal heat exchanger and a secondary working fluid such that the primary working fluid receives thermal energy from the secondary working fluid and the temperature of the primary working fluid in increased. The geothermal heat arrangement is thus operated in a charging mode in which the primary working fluid receives thermal energy from the secondary working fluid in the heat exchange between the primary working fluid circulating in the geothermal heat exchanger and the secondary working fluid. The primary working fluid is further circulated in the charging mode in a downwards direction in the rise pipe 10, 11 and in a direction upwards in the drain pipe 20, 21 for transporting thermal energy, meaning the primary working fluid or the heated primary flow 22 in elevated temperature, to the lower end 4 of the ground hole 4 and for releasing thermal energy from the primary working fluid to the ground at the lower end of the ground hole 2. Therefore, thermal energy is charged to the ground at the lower end 4 of the ground hole 2.

The method may further comprise operating the geothermal heat arrangement in an extraction mode in which the primary working fluid releases thermal energy to the secondary working fluid in the heat exchange between the primary working fluid circulating in the geothermal heat exchanger and the secondary working fluid. In the extraction mode the primary working fluid may be circulated in a downwards direction in the drain pipe 20, 21 and in a direction upwards in the rise pipe 10, 11 for transporting thermal energy, meaning the primary working fluid or the heated primary flow at elevated temperature, from the ground hole 2 and for releasing thermal energy from the primary working fluid to the secondary working fluid in the heat exchange between the primary working fluid circulating in the geothermal heat exchanger and a secondary working fluid.

Providing the heat exchange between the primary working fluid circulating in the geothermal heat exchanger and a secondary working fluid may comprise utilizing any kind of heat source or additional heat source for proving thermal energy to the secondary working fluid. The additional heat source may be such that it is not connected to the method and arrangement during extraction mode in which thermal energy is extracted from the ground hole 2. Accordingly, the method may comprise utilizing waste heat of ventilation system of building 50, thermal energy of an industrial plant, power plant or factory, or excess thermal energy of a data server facility or an urban heat source as a source for heating the secondary working fluid. Alternatively, the method may comprise producing thermal energy by utilizing wind power, water power or solar power for heating the secondary working fluid.

The method may also comprise providing the heat exchange between the primary working fluid circulating in the geothermal heat exchanger and a secondary working fluid in the heat pump 30. Thus, the method comprises operating the heat pump in cooling mode in which the primary working fluid receives thermal energy from the secondary working fluid in the heat pump 30 and operating the geothermal heat exchanger in the charging mode. Alternatively, the method may comprise operating the heat pump in heating mode in which the secondary working fluid receives thermal energy from the primary working fluid in the heat pump 30 and operating the geothermal heat exchanger in the extraction mode.

The method may also comprise operating the heat pump in cooling mode in which the primary working fluid receives thermal energy from the secondary working fluid in the heat pump 30 and operating the geothermal heat exchanger in the charging mode, and operating the heat pump in heating mode in which the secondary working fluid receives thermal energy from the primary working fluid in the heat pump 30 and operating the geothermal heat exchanger in the extraction mode.

The invention has been described above with reference to the examples shown in the figures. However, the invention is in no way restricted to the above examples but may vary within the scope of the claims.

The invention claimed is:

1. A geothermal heat arrangement comprising:
   a ground hole provided into the ground and extending into the ground from the ground surface, the ground hole having a lower end;
   a piping arrangement comprising a rise pipe having a lower end and arranged into the ground hole, and a drain pipe having a lower end, the lower end of the rise pipe and the lower end of the drain pipe being arranged in fluid communication with each other for circulating the primary working fluid in the ground hole;
   the rise pipe is provided with a first thermal insulation surrounding the rise pipe along at least part of the length of the rise pipe;
   a first pump connected to the piping arrangement and arranged to circulate the primary working fluid in the rise pipe; and
   a heat exchange connection in connection with the piping arrangement for secondary heat exchange with the primary working fluid,
   wherein:
   the rise pipe is arranged inside the drain pipe in the ground hole;
   the depth of the ground hole is at least 300 m;
   the first pump is arranged to circulate the primary working fluid in a direction towards the lower end of the ground hole in the rise pipe and towards the ground surface in the drain pipe;
   a heat pump or a heat exchanger is connected to the piping arrangement and arranged to provide heat exchange connection for the secondary heat exchange with the primary working fluid;
   the heat pump or the heat exchanger is arranged to release thermal energy to the primary working fluid for heating the primary working fluid; and
   the first pump is arranged to circulate the heated primary working fluid in the direction towards the lower end of the ground hole in the rise pipe for storing thermal energy to the ground at the lower end of the ground hole.

2. The geothermal heat arrangement according to claim 1, wherein:
   the ground hole forms at least part of the drain pipe for circulating the primary working fluid in the ground hole;
   the piping arrangement comprises a separate drain pipe having a lower end arranged into the ground hole, the lower end of the rise pipe and the lower end of the separate drain pipe being arranged in fluid communication with each other for circulating the primary working fluid in the ground hole, the rise pipe being arranged inside the separate drain pipe; or
   the piping arrangement comprises a separate drain pipe having a lower end arranged into the ground hole, the lower end of the rise pipe and the lower end of the separate drain pipe being arranged in fluid communication with each other for circulating the primary working fluid in the ground hole; and
   the rise pipe is arranged inside the separate drain pipe in the ground hole, and that the rise pipe extends an extension distance (M) out from the lower end of the drain pipe towards the lower end of the ground hole; or
   the piping arrangement comprises a separate drain pipe having a lower end arranged into the ground hole, the lower end of the rise pipe and the lower end of the separate drain pipe being arranged in fluid communication with each other for circulating the primary working fluid in the ground hole; and
   the separate drain pipe extends from the ground surface into the ground hole to a free distance (P) from the lower end of the ground hole such that the ground hole forms the drain pipe along the free distance (P) from the lower end of the ground hole; or
   the ground hole forms the drain pipe and the rise pipe is arranged inside the ground hole.

3. The geothermal heat arrangement according to claim 1, wherein:
   the first thermal insulation extends along the rise pipe from ground surface towards the lower end of the ground hole and to at least 50% of the depth (D) of the ground hole or to at least ⅔ of the depth (D) of the ground hole; or
   the first thermal insulation extends from a predetermined distance (E) from the lower end of the ground hole upwards along the rise pipe, the predetermined distance (E) from the lower end of the ground hole being at least 10% of the depth (D) of the ground hole or at least 20% of the depth (D) of the ground hole; or
   the first thermal insulation extends along the rise pipe between ground surface and the lower end of the ground hole and from a predetermined distance (E) from the lower end of the ground hole along the rise pipe towards the ground surface along the rise pipe and from a predetermined distance from the ground surface towards the lower end of the ground hole.

4. The geothermal heat arrangement according to claim 1, wherein:
   the thermal conductivity of the first thermal insulation is uniform in a direction along the ground hole; or
   the thermal conductivity of the first thermal insulation decreases in the direction towards the lower end of the ground hole; or
   the thickness of the first thermal insulation decreases in the direction towards the lower end of the ground hole such that the thermal conductivity of the first thermal insulation decreases in the direction towards the lower end of the ground hole; or
   the first thermal insulation comprises at least two different thermal insulation materials arranged to the rise pipe such the thermal conductivity of the first thermal insulation decreases in the direction towards the lower end of the ground hole.

5. The geothermal heat arrangement according to claim 1, wherein:
   the first pump is a reversible pump arranged to pump the primary working fluid in a direction towards the lower end of the ground hole in the rise pipe and upwards towards the ground surface in the drain pipe, or towards the lower end of the ground hole in the drain pipe and upwards towards the ground surface in the rise pipe, and that the geothermal heat arrangement comprises a control unit connected to the first pump and arranged to control the operation direction of the reversible first pump; or
   the geothermal heat arrangement comprises a second pump arranged to pump the primary working fluid in a direction towards the lower end of the ground hole in the drain pipe and upwards towards the ground surface in the rise pipe, and that the geothermal heat arrangement comprises a control unit connected to the first pump and to the second pump arranged to control the operation of the first pump and the second for setting the circulation direction of the primary working fluid.

6. A method for charging thermal energy into ground, the method comprises:

circulating a primary working fluid in a geothermal heat exchanger comprising a piping arrangement having a rise pipe arranged into a ground hole and a drain pipe, the rise pipe and the drain pipe being arranged in fluid communication with each other for circulating a primary working fluid in the ground hole for geothermal heat exchange in the ground hole, the rise pie is arranged inside the drain pipe in the ground hole, the ground hole extending from the ground surface into the ground and having a lower end, the depth of the ground hole is at least 300 m; the rise pipe being provided with a first thermal insulation surrounding the rise pipe along at least part of the length of the rise pipe; and providing heat exchange between the primary working fluid circulating in the geothermal heat exchanger and a secondary working fluid with a heat pump, wherein the method comprises:

operating the heat pump in cooling mode in which the primary working fluid receives thermal energy from the secondary working fluid in the heat pump in the heat exchange between the primary working fluid circulating in the geothermal heat exchanger and the secondary working fluid for heating primary working fluid; and operating the geothermal heat exchanger in a charging mode in which the heated primary working fluid is circulated in a downwards direction in the rise pipe and in a direction upwards in the drain pipe for transporting thermal energy to the lower end of the ground hole and for releasing thermal energy from the heated primary working fluid to the ground at the lower end of the ground hole for storing thermal energy to the ground at the lower end of the ground hole.

7. The method according to claim 6, wherein the method comprises:

operating the geothermal heat exchanger in an extraction mode in which the primary working fluid releases thermal energy to the secondary working fluid in the heat exchange between the primary working fluid circulating in the geothermal heat exchanger and the secondary working fluid; and circulating the primary working fluid in the extraction mode in a downwards direction in the drain pipe and in a direction upwards in the rise pipe for transporting thermal energy from the ground hole and for releasing thermal energy from the primary working fluid to the secondary working fluid in the heat exchange between the primary working fluid circulating in the geothermal heat exchanger and a secondary working fluid.

8. The method according to claim 6, wherein the method comprises providing the heat exchange between the primary working fluid circulating in the geothermal heat exchanger and a secondary working fluid in a heat pump, the method further comprising:

operating the heat pump in heating mode in which the secondary working fluid receives thermal energy from the primary working fluid in the heat pump and operating the geothermal heat exchanger in the extraction mode.

* * * * *